United States Patent [19]

Vock et al.

[11] 4,243,688
[45] Jan. 6, 1981

[54] FLAVORING WITH 2-SUBSTITUTED-4,5-DIMETHYL-Δ³-THIAZOLINES

[75] Inventors: Manfred H. Vock, Locust; Christopher Giacino, Califon; Anne Hruza, Bricktown; Donald A. Withycombe, Lincroft; Braja D. Mookherjee, Holmdel; Cynthia J. Mussinan, Bricktown, all of N.J.

[73] Assignee: International Flavors & Fragrances Inc., New York, N.Y.

[21] Appl. No.: 100,535

[22] Filed: Dec. 5, 1979

Related U.S. Application Data

[63] Continuation of Ser. No. 17,806, Mar. 5, 1979, abandoned, which is a continuation-in-part of Ser. No. 730,536, Oct. 7, 1976, abandoned.

[51] Int. Cl.³ .................. A23L 1/234; A23L 1/226
[52] U.S. Cl. ........................... 426/535; 548/146
[58] Field of Search ................................ 426/535

[56] References Cited

U.S. PATENT DOCUMENTS

| | | | |
|---|---|---|---|
| 2,879,273 | 3/1959 | Asinger et al. | 548/147 |
| 3,816,445 | 6/1974 | Dubs et al. | 426/535 UX |

OTHER PUBLICATIONS

Mussinan et al., "Identification and Flavor Properties of Some 3-Oxazolines and 3-Thiazolines Isolated From Cooked Beef", Abstract of Papers, 170th Meeting, American Chemical Society, Aug. 24-29, 1975, Port City Press, Baltimore.

*Primary Examiner*—Joseph M. Golian
*Attorney, Agent, or Firm*—Arthur L. Liberman

[57] ABSTRACT

Processes and compositions are described for use in foodstuff flavors and as foodstuff article aroma and taste augmenting and enhancing materials of at least one 2-substituted-4,5-dimethyl-Δ³-thiazolines having the structure:

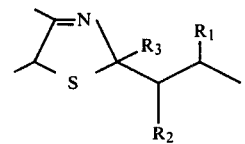

wherein one of $R_1$, $R_2$ and $R_3$ is methyl and each of the other of $R_1$, $R_2$ and $R_3$ is hydrogen. The compounds of our invention are useful in augmenting or enhancing the flavor and aroma nuances of vegetable, spice, nutty, chocolate and black pepper flavors.

1 Claim, 16 Drawing Figures

FIG.2
GC-MS PROFILE ISOMER I FOR EXAMPLE I
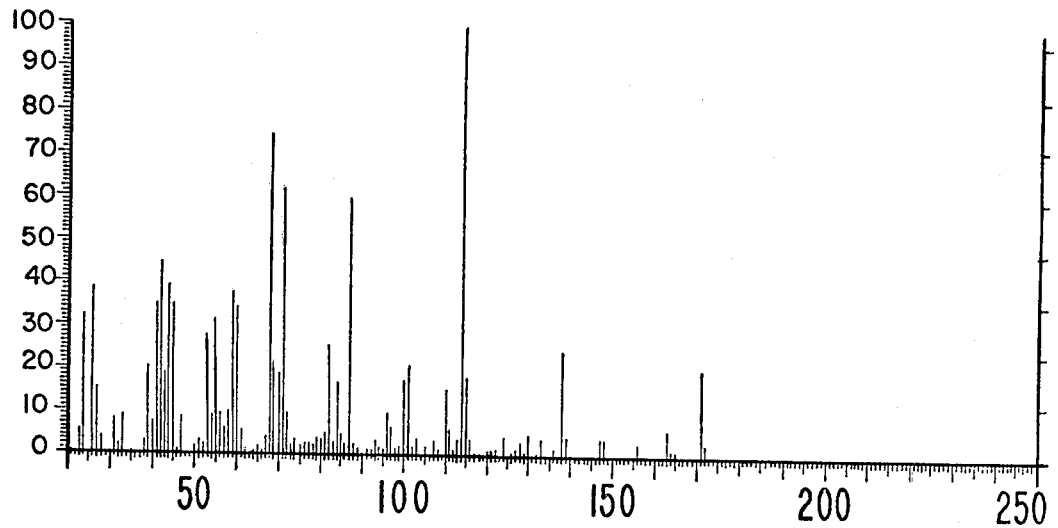
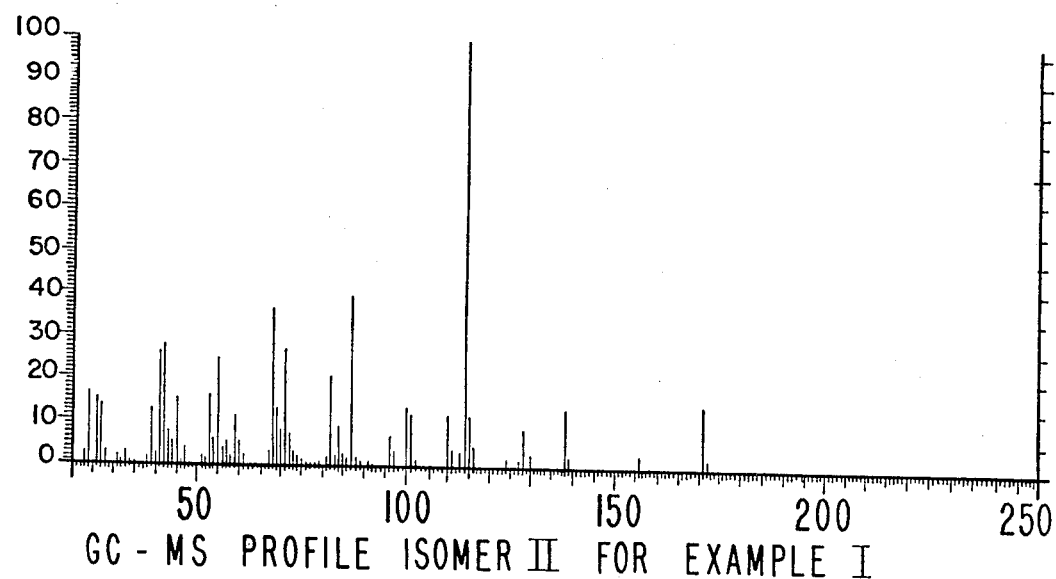
GC-MS PROFILE ISOMER II FOR EXAMPLE I
FIG.3

FIG.4
GC-MS PROFILE ISOMER I FOR EXAMPLE I
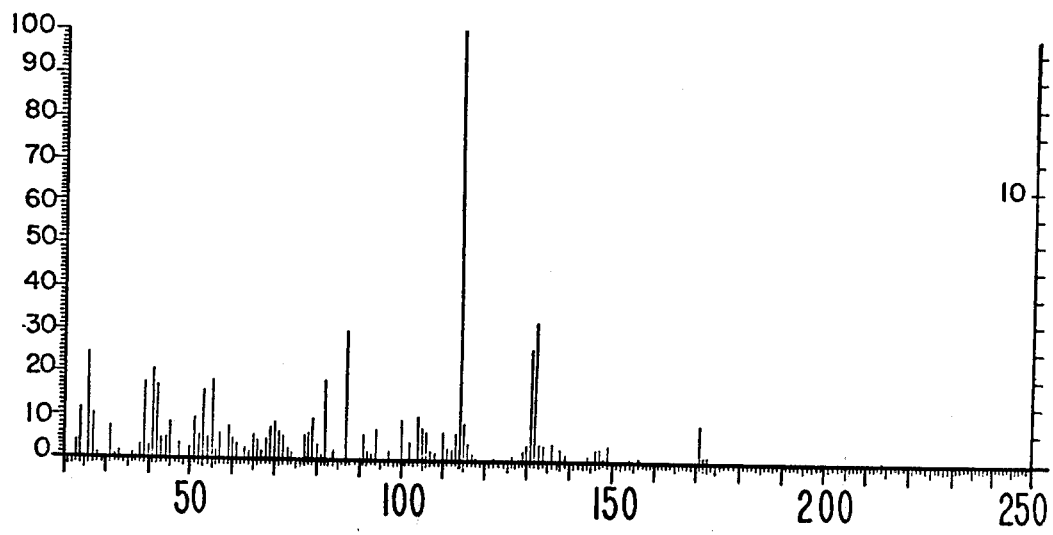
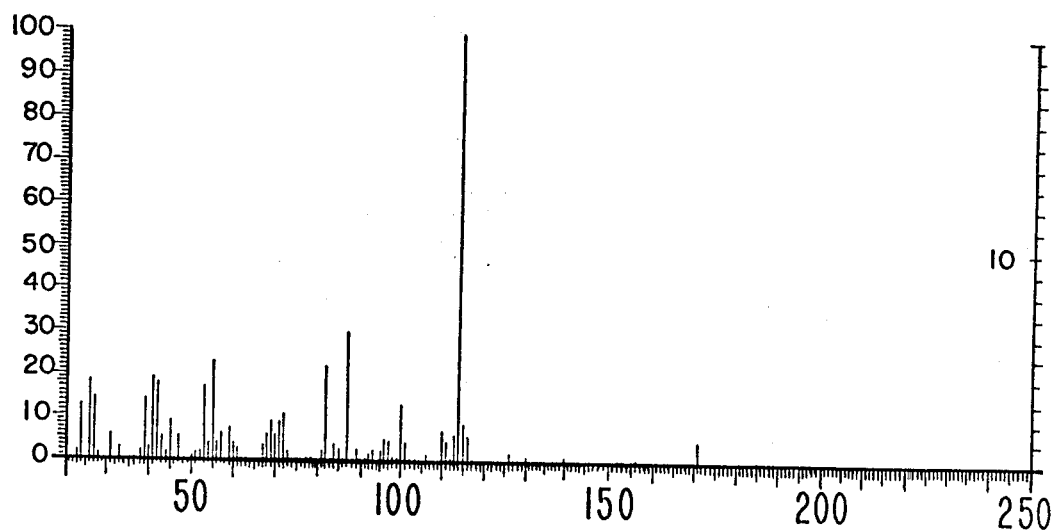
FIG.5
GC-MS PROFILE ISOMER II FOR EXAMPLE I

GC-MS PROFILE ISOMER I FOR EXAMPLE II

GC-MS PROFILE ISOMER II FOR EXAMPLE II

NMR SPECTRUM FOR EXAMPLE II

IR SPECTRUM FOR EXAMPLE I

FIG.10
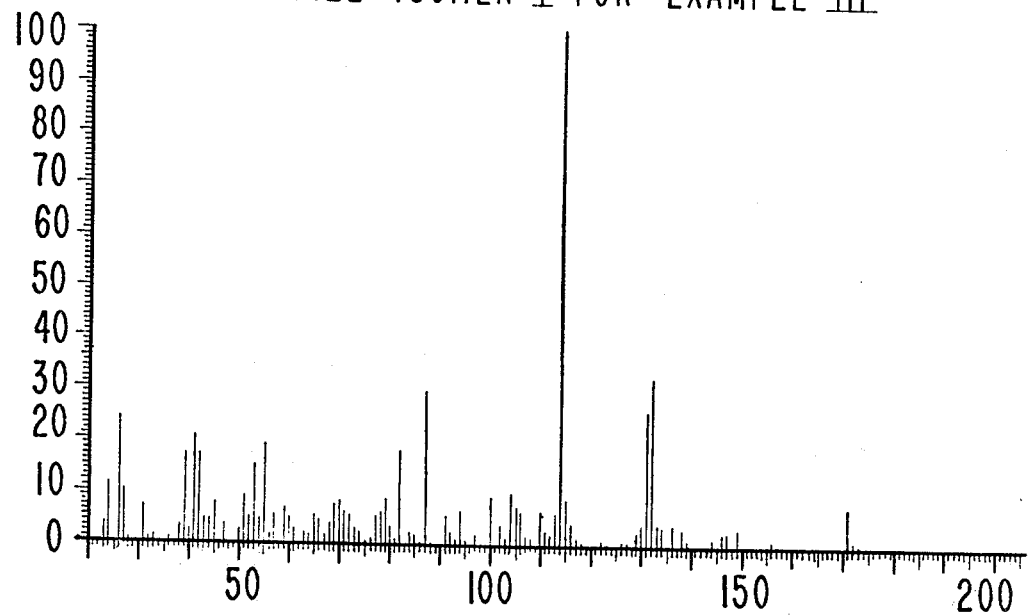
GC-MS PROFILE ISOMER I FOR EXAMPLE III
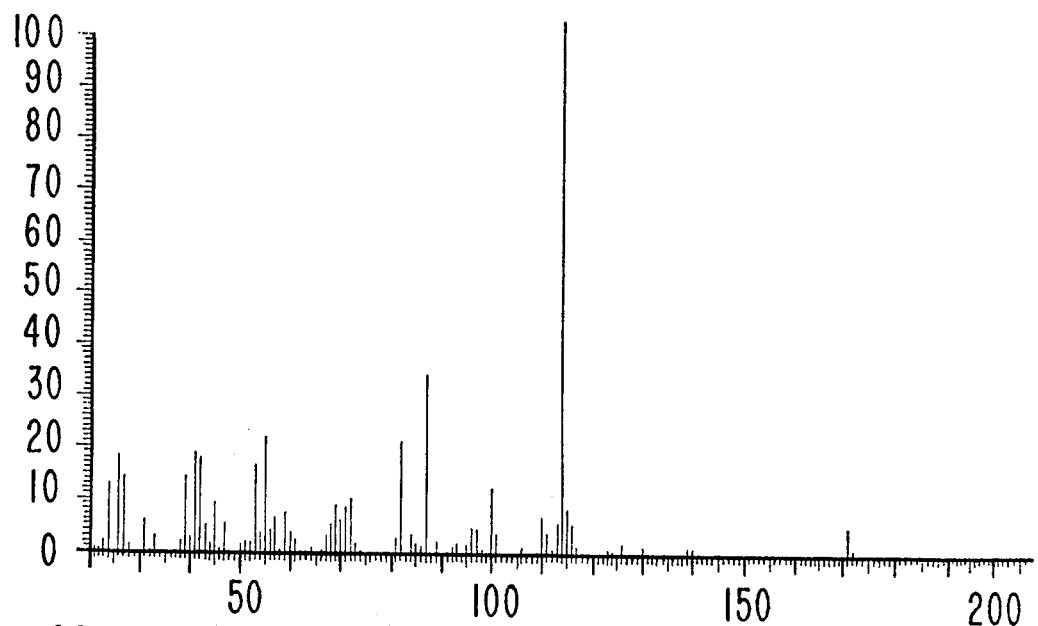
GC-MS PROFILE ISOMER II FOR EXAMPLE III
FIG.11

NMR SPECTRUM FOR EXAMPLE III

IR SPECTRUM FOR EXAMPLE III

FIG. 14 GC-MS PROFILE FOR EXAMPLE IV

NMR SPECTRUM FOR EXAMPLE IV

SOLVENT: $CDCl_3$
SWEEP WIDTH: 1000 Hz.

IR SPECTRUM FOR EXAMPLE IV

FLAVORING WITH 2-SUBSTITUTED-4,5-DIMETHYL-Δ³-THIAZOLINES

This is a continuation of application Ser. No. 017,806, filed Mar. 5, 1979, now abandoned, which is a continuation-in-part of application Ser. No. 730,536, filed Oct. 7, 1976, now abandoned.

BACKGROUND OF THE INVENTION

The present invention relates to 2-substituted-4,5-dimethyl-Δ³-thiazolines and novel compositions using such compounds to augment or enhance the flavor and/or aroma of foodstuffs.

There has been considerable work performed related to substances useful in augmenting or enhancing the flavor and/or aroma of various consumable materials including foodstuffs. These substances are used to diminish the use of natural materials, some of which may be in short supply and/or provide more uniform properties in the finished product. The following flavor and aroma notes are desirable, particularly in vegetable, spice, black pepper, nut and chocolate flavored foodstuffs:

Aroma

Sweet,
Green bean-like,
Cucumber-like,
Spicey,
Roasted,
Roasted meat-like,
Roasted nut-like,
Dark chocolate-like,
Baked goods-like,
Vegetable greens-like,
Herbaceous,
Milk chocolate-like,
Nut-like,
Vegetable-like.

Flavor

Cucumber-like,
Green bean-like,
Spicey,
Watermelon-like,
Black pepper-like,
Astringent,
Sweet,
Roasted,
Roasted meat-like,
Roasted nut-like,
Chocolate-like,
Vegetable green-like,
Hydrolyzed vegetable protein-like,
Herbaceous and
Nutty.

U.S. Pat. No. 3,816,445 issued on June 11, 1974, discloses 2-substituted-Δ³-thiazolines as flavorants, which Δ³ thiazolines have the generic structure:

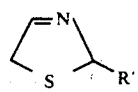

wherein R' may be $C_3-C_{11}$ alkyl, benzyl or 2-methylthioethyl. It is disclosed at column 2, lines 46–50 that generically speaking, these compounds have "interesting vegetable notes such as bean, tomato, pepperoni, asparagus as well as potato notes." Specifically disclosed are compounds having the structures:

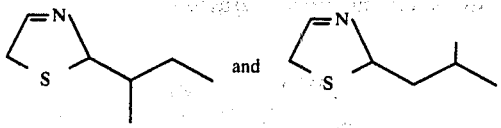

Thus, for example, 2-isobutyl-Δ³-thiazoline is indicated to have a "typical bean-like" fragrance with a "weak pepperoni note." The compounds are also disclosed in corresponding Swiss Pat. No. 565,515.

Compounds having the generic structure:

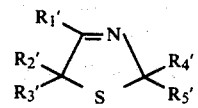

Wherein $R_1'$, $R_2'$, $R_3'$, $R_4'$ and $R_5'$ may be hydrogen or alkyl, are disclosed in U.S. Pat. No. 3,700,683 (as being intermediates for syntheses of penicillamine); in German Auslegungschrift No. 1,058,061 published on May 27, 1959; in German Auslegungschrift No. 1,063,602 published on Aug. 20, 1959; and in German Auslegungschrift No. 1,095,284 published on Dec. 22, 1960. The same generic structure is published by the same authors in U.S. Pat. No. 3,004,981 issued on Oct. 17, 1961. The compounds are not shown in this patent to have a utility as food flavorants, but rather as indicated at column 5, line 71 to:

"exhibit considerable physiological action and may thus be used in the synthesis of therapeutic agents. They constitute valuable intermediates and final products for the pharmaceutical industry. Further, they may be used for many other purposes as, for example, as agents for combating pests, as preservatives for the preservation of wood, as weed killers and as protecting agents against rust and aging."

Specifically, the compound 2,4,5-trimethyl-2-ethyl-Δ³-thiazoline is indicated to be produced according to Example I, and this compound has the structure:

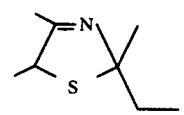

2,4,5-trimethyl thiazoline having the structure:

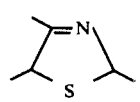

has been identified in cooked beef, and it has been stated that it is a contributing factor to the flavor properties of cooked beef in a paper entitled "Identification and Flavor Properties of Some 3-oxazolines and 3-thiazolines Isolated from Cooked Beef," by Mussinan, Wilson, Katz, Hruza and Vock (Presented: Paper #22, Agricultural and Food Chemistry Division, 170th National Meeting, American Chemical Society, Chicago, Illinois, Aug. 26, 1975; In Press: Advaices in Chemistry Series, American Chemical Nevertheless, the prior art fails to disclose compounds having the generic structure:

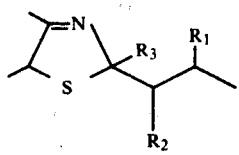

wherein one of $R_1$, $R_2$ and $R_3$ is methyl and each of the other of $R_1$, $R_2$ and $R_3$ is hydrogen, specifically, and fails to disclose that such compounds have utility in vegetable flavors, spice flavors, black pepper flavors, chocolate flavors or nut flavors.

THE INVENTION

The invention comprises novel compositions and foodstuffs containing 2-substituted-4,5-dimethyl-$\Delta^3$-thiazolines having the structure:

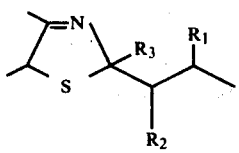

wherein one of $R_1$, $R_2$ and $R_3$ is methyl and each of the other of $R_1$, $R_2$ and $R_3$ is hydrogen, the specific embodiments of which are described hereinafter by way of example and in accordance with which it is now preferred to practice the invention.

Such 2-substituted-4,5-dimethyl-$\Delta^3$-thiazolines are obtained by reacting an aldehyde or ketone with aqueous ammonia thereby forming the corresponding imine and reacting the thus-formed imine with 2-mercapto-3-butanone according to the following reaction sequence:

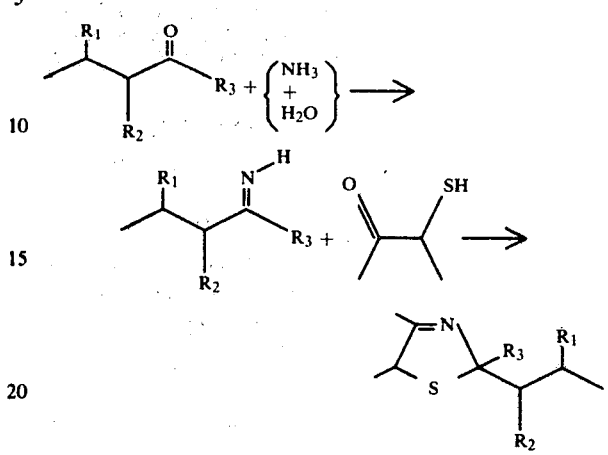

details of which process are set forth hereinafter by way of example and are broadly set forth in the prior art, U.S. Pat. No. 2,879,273 issued on Mar. 24, 1959; U.S. Pat. No. 3,816,445 issued on June 11, 1974, and German Auslegungschrift No. 1,095,284 published on Dec. 22, 1960.

Specific examples of 2-substituted-4,5-dimethyl-$\Delta^3$-thiazolines produced using the afore-mentioned process and their food flavor properties are as follows (as set forth in Table I below):

TABLE I

| Compound | Structure | Flavor Property |
|---|---|---|
| 2-(2'-methylpropyl)-4,5-dimethyl-$\Delta^3$-thiazoline | | A sweet, roasted meat-like, roasted nut-like, dark chocolate-like, baked goods-like and vegetable green-like aroma with a sweet, roasted meat-like, roasted nut-like, chocolate-like, vegetable green-like, hydrolyzed vegetable protein-like taste having hydrolyzed vegetable protein aftertaste and astringent and chocolate-like notes. |
| 2-(2'-n-butyl)4,5-dimethyl-$\Delta^3$-thiazoline | | A sweet, herbaceous, spicey, chocolate-like, nutty, vegetable-like, hydrolyzed vegetable protein-like, roasted aroma with herbaceous, vegetable green-like, nutty, roasted, chocolate-like flavor and an astringent character. |
| 2-n-propyl-2,4,5-trimethyl-$\Delta^3$-thiazoline | | A sweet, green bean-like, cucumber-like, geranium-like and spicey aroma with cucumber-like, green bean-like, spicey, watermelon-like, black papper-like flavor characteristics and an astringent character. |

The distillate of hydrolyzed vegetable protein (as produced according to Example I, infra), appears to contain the following $\Delta^3$-thiazoline derivatives:
2,4-dimethyl-$\Delta^3$-thiazoline;
4,5-dimethyl-$\Delta^3$-thiazoline;

2,4,5-trimethyl-Δ³-thiazoline;
2-propyl-2,4,5-trimethyl-Δ³-thiazoline;
2-ethyl-2,4,5-trimethyl-Δ³-thiazoline;
2-(2'-butyl)-4-methyl-Δ³-thiazoline;
2-n-butyl-4,5-dimethyl-Δ³-thiazoline;
2-benzyl-4-methyl-Δ³-thiazoline;
2,5-dimethyl-2-benzyl-Δ³-thiazoline;
2-(2'-methyl-n-propyl)-4,5-dimethyl-Δ³-thiazoline.

The presence of the foregoing materials in the distillate of refluxing hydrolyzed vegetable protein is indicated in various peaks in FIG. 1. The presence of such compounds in hydrolyzed vegetable protein distillate is not considered to infer that these compounds can be used as foodstuff flavorants or in order to augment or enhance the flavor or aroma of a foodstuff.

When the 2-substituted-4,5-dimethyl-Δ³-thiazoline compound or compounds of our invention are used as food flavor adjuvants, or are used to augment or enhance the flavor or aroma characteristics of foodstuffs, the nature of the co-ingredients included with the said 2-substituted-4,5-dimethyl-Δ³-thiazolines in formulating the product composition will also serve to augment the organoleptic characteristics of the ultimate foodstuff treated therewith.

As used herein in regard to flavors, the term "augment" in its various forms means "supplying or imparting flavor character or note to otherwise bland, relatively tasteless substances or augmenting the existing flavor characteristic where a natural flavor is deficient in some regard or supplementing the existing flavor impression to modify its quality, character or taste."

As used herein in regard to food flavors, the term "enhance" is used herein to mean the intensification of a flavor or aroma characteristic or note without the modification of the quality thereof. Thus, "enhancement" of a flavor or aroma means that the enhancement agent does not add any additional flavor note.

As used herein the term "foodstuff" includes both solids and liquids, and ingestible materials or chewable but noningestible materials such as chewing gum. Such materials usually do, but need not, have nutritional value. Thus, foodstuffs include soups, convenience foods, beverages, gelatin desserts, dairy products, candies, vegetables, cereals, soft drinks, snacks and the like.

Substances suitable for use herein as co-ingredients or flavoring adjuvants are well known in the art for such use, being extensively described in the relevant literature. Apart from the requirements that any such materials be organoleptically compatible with the 2-substituted-4,5-dimethyl-Δ³-thiazolines, non-reactive with the 2-substituted-4,5-dimethyl-Δ³-thiazolines of our invention and "ingestibly" acceptable and thus non-toxic or otherwise non-deleterious, nothing particularly critical resides in the selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydrolyanisole (mixture of 2 and 3 tertiary-butyl-4-hydroxyanisole), butylated hydroxy toluene (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agaragar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins and emulsifiers, e.g., mono- and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g. carminic acid, cochineal, tumeric and curcuma and the like; firming agents such as aluminum sodium sulfate; calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include vanillin, ethyl vanillin, diacetyl, phenethyl 2-furoate, maltol, neryl butyrate, dimethyl sulfide, linalool, acetic acid, methyl sulfide, acetaldehyde, isovaleraldehyde, isoamyl alcohol, acetic acid, lactones, isoamyl esters including the acetate, butyrate, and octanoate, pyrazine, methyl pyrazine, dimethyl pyrazine, 2-ethyl-3-methyl pyrazines, 2,3-diethyl-5-methyl pyrazines, isobutyl phenyl alcohol, amyl octanoate, isoamyl-2-furan butyrate, benzoic acid, pyridine, phenylacetic acid, isobutyl phenethyl alcohol, cinnamyl esters such as the propionate, cinnamyl phenyl acetate, 4-phenyl-3-butene-2-one, 3-phenyl-2-pentenal, 3-phenyl-3-pentenal, 3-phenyl-4-pentenal, 3-(2-methylphenyl)-4-pentenal, 3-phenyl-4-methyl-4-pentenal, 2-phenyl-4-pentenal, 2-phenyl-4-pentenal dimethyl acetal, 2-isobutylthiazole, 2(secondary butyl) thiazole, cocoa extracts, cocoa distillates, cocoa bean particles, "bitterness principles" such as theobromin, caffein and naringin, "astringency principles" such as tannins, quebracho, and theotannates, and the like. These are combined in proportions requisite to obtain the desired effect as illustrated further hereinbelow.

The specific flavoring adjuvant selected for use may be either solid or liquid depending upon the desired physical form of the ultimate product, i.e., foodstuff, whether simulated or natural, and should, in any event, be capable of providing an environment in which the 2-substituted-4,5-dimethyl-Δ³-thiazolines can be dispersed or admixed to provide a homogeneous medium. In addition, selection of one or more flavoring adjuvants, as well as the quantities thereof, will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-substituted-4,5-dimethyl-$\Delta^3$-thiazolines employed in a particular instance can vary over a relatively wide range whereby to its desired organoleptic effects having reference to the nature of the product are achieved. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected be effective, i.e., sufficient to alter the organoleptic characteristics of the parent composition.

The use of insufficient quantities of 2-substituted-4,5-dimethyl-$\Delta^3$-thiazolines will, of course, substantially vitiate any possibility of obtaining the desired results while excess quantities prove needlessly costly and may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 2-substituted-4,5-dimethyl-$\Delta^3$-thiazolines ranging from a small but effective amount, e.g., about 0.1 parts per million up to about 50 parts per million by weight based on total composition (more preferably from about 0.2 ppm up to about 10 ppm) are suitable. Concentrations in excess of the maximum quantity stated are not normally recommended, since they fail to prove commensurate enhancement of organoleptic properties. In those instances, wherein the 2-substituted-4,5-dimethyl-$\Delta^3$-thiazoline is added to the foodstuff as an integral component of a flavoring composition, it is, of course, essential that the total quantity of flavoring composition employed be sufficient to yield an effective thiazoline concentration in the foodstuff product.

Food flavoring compositions prepared in accordance with the present invention preferably contain the 2-substituted-4,5-dimethyl-$\Delta^3$-thiazoline in concentrations ranging from about 0.1% up to about 15% by weight based on the total weight of said flavoring composition.

The compositions described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the 2-substituted-4,5-dimethyl-$\Delta^3$-thiazoline with, for example, gum arabic, gum tragacanth, carrageenan and the like, and thereafter spray-drying the resultant mixture whereby to obtain the particular solid product. Pre-prepared flavor mixed in powder form, e.g., a fruit-flavored powder mix, are obtained by mixing the dried solid components, e.g., starch, sugar and the like and 2-substituted-4,5-dimethyl-$\Delta^3$-thiazoline in a dry blender until the requisite degree of uniformity is achieved.

It is presently preferred to combine with the 2-substituted-4,5-dimethyl-$\Delta^3$-thiazoline, the following adjuvants:
Acetaldehyde;
Isobutyraldehyde;
Isovaleraldehyde;
Dimethyl sulfide;
Isobutyl acetate;
Isoamyl acetate;
Phenylethyl acetate;
Diacetyl;
Acetophenone;
Furfural
Benzaldehyde
Phenylacetaldehyde;
Isoamyl alcohol;
Phenylethyl alcohol;
$\gamma$-Butyrolactone;
3-Phenyl-4-pentenal;
3-Phenyl-3-pentenal;
3-Phenyl-2-pentenal;
2-Methyl pyrazine;
2,6-Dimethyl pyrazine;
2,3,5,6-Tetramethyl pyrazine;
2,3,5-Trimethylpyrazine;
2-Ethyl-3-methylpyrazine;
2-Ethyl-3,5-dimethylpyrazine;
2-Ethyl-3,6-dimethylpyrazine;
2-Ethyl-5-methylpyrazine;
2(n-pentyl) thiazole;
2(i-butyl) thiazole;
2(i-propyl) thiazole;
2(n-propyl) thiazole;
2-phenyl-4-pentenal;
2-phenyl-4-pentenaldimethylacetal;
Methional;
4-methylthiobutanal;
2-ethyl-3-acetylpyrazine
trans-2-hexenal;
Hydrolyzed vegetable protein;
Monosodium glutamate;
Black pepper oil;
Nutmeg oil;
Celery oil;
Lemon oil;
Mustard oil;

The following examples are given to illustrate embodiments of the invention as it is presently preferred to practice it. It will be understood that these examples are illustrative and that the invention is not to be considered as restricted thereto except as indicated in the appended claims.

EXAMPLE I

Preparation of Reflux Distillate of Hydrolyzed Vegetable Protein

Into a 22-liter, round-bottom flask equipped with heating mantle, air-driven stirrer, 4 cm × 57 cm jacketed column packed with ⅛ inch glass helices, magnetically controlled reflux takeoff head and one liter addition funnel, is placed 5 kg Nestle 4BE hydrolyzed vegetable protein and 10 liters distilled water. The reaction mixture is heated to reflux, and reflux is commenced with a "take-off" at a rate of 20%. Two liters of distillate are collected, and the distillate is extracted with diethyl ether. The diethyl ether extract is concentrated to 100 ml and fractionated into acidic, phenolic, basic and neutral components. Each of the fractions is analyzed using GLC, NMR, mass spectral and IR analyses. The following thiazolines are determined by means of the foregoing analyses in the basic fraction:

2,4-dimethyl-Δ³-thiazoline;
4,5-dimethyl-Δ³-thiazoline;
2,4,5-trimethyl-Δ³-thiazoline;
2-propyl-2,4,5-trimethyl-Δ³-thiazoline
2-ethyl-2,4,5-trimethyl-Δ³-thiazoline;
2-(2'-butyl)-4-methyl-Δ³-thiazoline;
2-n-butyl-4,5-dimethyl-Δ³ thiazoline;
2-benzyl-4-methyl-Δ³-thiazoline;
2,5-dimethyl-2-benzyl-Δ³-thiazoline;
2-(2'-methyl-n-propyl)-4,5-dimethyl-Δ³ thiazoline.

The GLC spectrum for the basic fraction is set forth in FIG. 1. The MS profile for 2(2-methyl-n-propyl)-4,5-dimethyl-Δ³-thiazoline present in the basic spectrum is set forth in FIG. 2 (isomer I) and FIG. 3 (isomer II).

The MS profile for 2-(2'-butyl)-4,5-dimethyl-Δ³-thiazoline is set forth in FIG. 4 (isomer I) and FIG. 5 (isomer II).

EXAMPLE II

Preparation of
2-(2-Methyl-n-Propyl)-4,5-Dimethyl-Δ³-Thiazoline

Reaction:

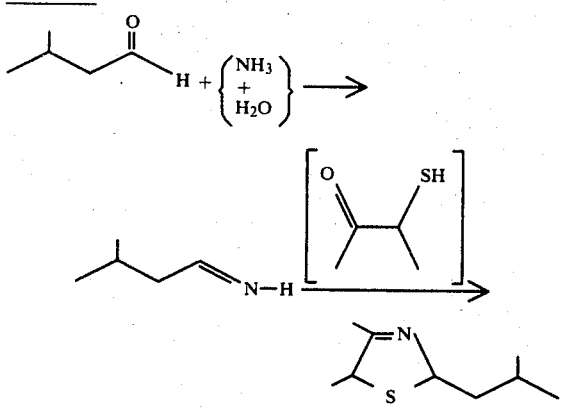

Into a 500 ml, three-necked, round-bottom flask equipped with stirrer, 250 ml addition funnel, ice bath and Fredericks condenser, is placed 45 ml water and 45 ml 58% aqueous NH₃. With stirring, 43 grams of isobutyraldehyde is added dropwise. 104 Grams of a 50% ethanolic solution of 3-mercapto-2-butanone is then added dropwise over a period of one hour. The reaction mass is then allowed to stir for one hour at room temperature.

The resulting product is extracted with three 100 ml portions of diethyl ether. The ether extracts are combined and dried over anhydrous sodium sulfate and then evaporated on a rotary evaporator. The resulting product is then distilled on a 12" Vigreux column at 4 mm Hg pressure and 70° C. vapor temperature yielding a product containing 97% 2-(2'-methyl-n-propyl)-4,5-dimethyl-Δ³-thiazoline.

The MS profiles show that two isomers exist; an "endo" and an "exo" isomer. The MS profile for isomer I is set forth in FIG. 6. The MS profile for isomer II is set forth in FIG. 7.

The NMR spectrum for the resulting product is set forth in FIG. 8.

The infrared spectrum for the resulting product is set forth in FIG. 9.

The NMR analysis is as follows:

| Chemical Shift | Assignment | Protons |
|---|---|---|
| 1.00 ppm (doublet of doublets) | "Isopropyl" methyl protons | 6H |
| 1.50 (doublet of doublets) | CH₃—C—S—<br>      \|<br>      C=N— | 3H |
| 2.10 (d, J=2H₂) | CH₃—C=N— | 3H |
| 2.00–1.60 (m) | —CH₂—+ H—C—<br>               \| | 3H |
| 4.25 (m) | HC—S<br> \|<br> C=N— | 1H |
| 5.55 (m) | HC—N=C=<br> \|<br> S— | 1H |

The IR analysis is as follows: 940 cm⁻¹, 1160, 1200, 1370, 1380, 1430, 1440, 1470, 1670, 2880, 2940, 2960.

The mass spectral analysis is as follows:

| M/E | Relative Intensity |
|---|---|
| 41 | 15 |
| 42 | 19 |
| 55 | 17 |
| 68 | 54[2] |
| 71 | 36[5] |
| 87 | 43[3] |
| 101 | 19 |
| 114 | 100[1] |
| 138 | 30[6] |
| M 171 | 40[4] |

EXAMPLE III

Preparation of
2-(2'-n-Butyl)-4,5-Dimethyl-Δ³-Thiazoline

Reaction:

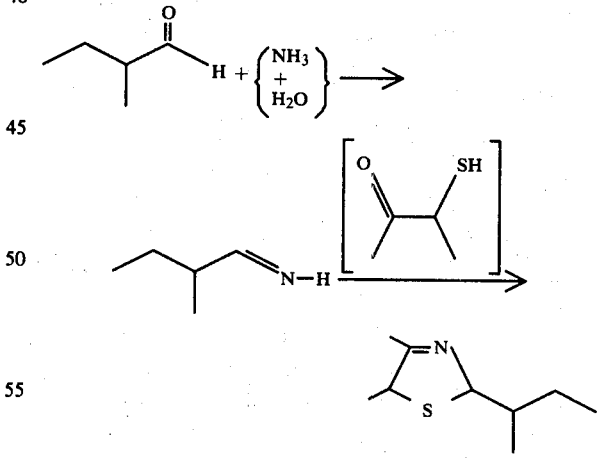

Into a 500 ml, three-necked, round-bottom flask equipped with mechanical stirrer, 250 ml addition funnel, thermometer, Friedrich's condenser, and ice bath, is placed 87.4 ml 30% aqueous ammonia and 45 ml distilled water. 43 Grams 2-methyl butanal is then added dropwise to the reaction mass while maintaining the reaction mass at room temperature. After completion of the addition of the 2-methyl butanal, 104 grams of a 50% (in 95% ethanol) solution of 3-mercapto-2-butanone is added dropwise over a period of one hour.

The reaction mass is then extracted with 300 ml diethyl ether in 3 portions. The ether extracts are combined and dried over anhydrous sodium sulfate, and then evaporated on a Rotovap. The resulting product is then distilled at a vapor temperature of 105°–107° C. and a vacuum of 20 mm Hg yielding a product containing 98% 2-(2'-n-butyl)-4,5-dimethyl-Δ³-thiazoline. The distillation is carried out on a 12" Vigreux column. In order to purify the resulting product, it is redistilled at 60°–61° C. at a pressure of 3 mm Hg.

The resulting material exists in two isomeric forms, an "endo" and an "exo" form. The MS profile for the first isomer is set forth in FIG. 10. The MS profile for the second isomer is set forth in FIG. 11.

The NMR spectrum is set forth in FIG. 12.

The infrared spectrum for the resulting material is set forth in FIG. 13.

The NMR analysis is as follows:

| Chemical Shift | Assignment | Protons |
|---|---|---|
| 1.01–0.80 ppm | methyl proton | 6H |
| 1.46 | CH₃—C—S—<br>      \|<br>      C=N— | 3H |
| 2.08 | CH₃—C=N— | 3H |
| 1.96–1.18 | methylene methine protons | 3H |
| 4.20 |     C=C<br>    \|<br>H—C—S—<br>    \| | 1H |
| 5.54 | H—C—S—<br>    \|<br>    N=C— | 1H |

The IR analysis is as follows: 910 cm⁻¹, 1250, 1370, 1430, 1450, 1460, 1670, 2880, 2940, 2960.

The mass spectral analysis is as follows:

| M/E | Relative Intensity |
|---|---|
| 41 | 9 |
| 42 | 8 |
| 55 | 8 |
| 71 | 7 |
| 82 | 14⁴ |
| 87 | 22² |
| 100 | 9⁵ |
| 114 | 100¹ |
| 115 | 9⁶ |
| M 171 | 17³ |

EXAMPLE IV

Preparation of 2,4,5-Trimethyl-2-n-Propyl-Δ³-Thiazoline

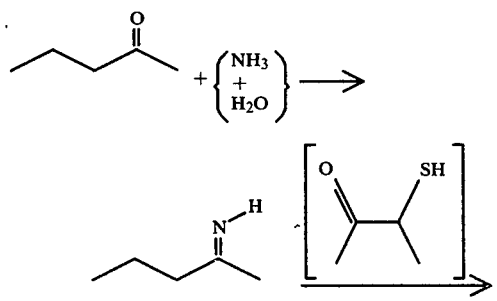

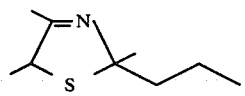

Into a 500 ml, three-necked, round-bottom flask equipped with mechanical stirrer, 250 ml addition funnel, thermometer, Friedrich's condenser and ice bath is placed 45.2 ml of a 58% aqueous NH₃ solution and 45 ml distilled water. 43.05 Grams of 2-pentanone is then added dropwise from the addition funnel with stirring while maintaining the reaction mass at a temperature of between 25° and 28° C. At the completion of the addition of the 2-pentanone, 104 grams of a 50% (in 95% ethanol) solution of 3-mercapto-2-butanone is then added to the reaction mass over a period of one hour with stirring while maintaining the reaction mass at room temperature. The reaction mass is then extracted with three 100 ml portions of diethyl ether, and the diethyl ether extracts are combined. The ether extracts are then washed with two 100 ml portions of water, and the ether extracts are dried over anhydrous sodium sulfate and evaporated on a rotary evaporator. The resulting product is then distilled at a vapor temperature of 104° C. and a pressure of 31 mm Hg.

The MS profile of the resulting material is set forth in FIG. 14.

The NMR spectrum of the resulting material is set forth in FIG. 15.

The infrared spectrum of the resulting material is set forth in FIG. 16.

The NMR spectrum analysis is set forth as follows:

| Chemical Shift (ppm) | Assignment | Quantification |
|---|---|---|
| 0.90 | CH₃— | 3H |
| 1.48 | CH₃—C—S | |
| 1.58 |     \|<br>CH₃—C—N= | 10H |
| 1.84–1.11 | —CH₂— | |
| 2.02 | CH₃—C=N— | 3H |
| 4.26 | CH₃—CH—S— | 1H |

The infrared analysis is as follows: 840 cm⁻¹, 895, 1130, 1180, 1250, 1370, 1450, 1670, 2880, 2940, 2960.

The mass spectral analysis is as follows:

| M/E | Relative Intensity |
|---|---|
| 42 | 31⁶ |
| 69 | 24 |
| 82 | 34⁵ |
| 87 | 44² |
| 96 | 22 |
| 110 | 34⁴ |
| 111 | 22 |
| 128 | 100¹ |
| 138 | 25 |
| M 171 | 40³ |

EXAMPLE V

A commercial cocoa mix is used to prepare two different batches of beverage. The first batch is evaluated without any further additive, while 2-(2'-methyl-n-propyl)-4,5-dimethyl-Δ³-thiazoline prepared according to Example II is added to the second batch in the ratio of 40 mg of said 2-(2'-methyl-n-propyl)-4,5-dimethyl- Δ³-thiazoline to each kilogram of cocoa beverage. The beverage without 2-(2'-methyl-n-propyl)-4,5-dimethyl-Δ³-thiazoline gives a rather harsh flavor impression, while the beverage containing 2-(2'-methyl-n-propyl)-4,5-dimethyl-Δ³-thiazoline according to the present invention has a fuller, richer sweet milk chocolate flavor.

EXAMPLE VI

A basic chocolate flavor composition is prepared by admixing the following ingredients:

| Compound | Amount (grams) |
| --- | --- |
| Dimethyl sulfide | 1.0 |
| Isobutyl acetate | 1.0 |
| Isoamyl acetate | 1.0 |
| Phenylethyl acetate | 0.5 |
| Diacetyl (10% in 95% food-grade ethyl alcohol) | 0.5 |
| Furfural (50% in propylene glycol) | 0.5 |
| Isoamyl alcohol | 1.0 |
| γ-Butyrolactone | 5.0 |
| Acetophenone | 0.5 |
| Benzaldehyde | 1.0 |
| Phenyl acetic acid | 2.0 |
| Maltol | 3.0 |
| Acetaldehyde | 2.0 |
| Isobutyraldehyde | 8.0 |
| Isovaleraldehyde | 15.0 |
| Phenylethyl alcohol | 8.0 |
| Vanillin | 15.0 |
| Propylene glycol | 40.0 |

The flavor is divided into two portions. To a first portion 2-(2'-methyl-n-propyl)-4,5-dimethyl-Δ³-thiazoline is added at a rate of 2%. To a second portion no thiazoline derivative is added. The two portions of flavor formulation are compared at a rate of 5 ppm in water and evaluated by a bench panel. It was found that the flavor containing the 2-(2'-methyl-n-propyl)-4,5-dimethyl-Δ³-thiazoline has a more characteristic cocoa powder note, both in aroma and taste, and is therefore preferred.

EXAMPLE VII

The following basic walnut formulation is prepared:

| Ingredient | Parts by Weight |
| --- | --- |
| Cyclotene | 4 |
| Vanillin | 2 |
| Butylisovalerate | 0.5 |
| Cuminaldehyde (10% in food-grade 95% ethyl alcohol) | 0.5 |
| 2,6-dimethoxyphenol (10% in food-grade 95% ethyl alcohol) | 0.5 |
| Benzaldehyde | 8 |
| 2,3-diethyl pyrazine | 2 |
| Ethyl-2-methyl butyrate | 0.5 |
| Gamma-butyrolactone | 20 |
| Gamma-hexalactone | 12 |
| Benzyl alcohol | 15 |
| Propylene glycol | 35 |

The basic walnut flavor formulation is divided into two portions. To a first portion at the rate of 8% is added 2-(2'-methyl-1-propyl)-4,5-dimethyl-Δ³-thiazoline. Nothing additional is added to the second portion of the basic walnut flavor formulation. The two formulations, both with and without the thiazoline derivative, are compared at the rate of 8 ppm by a bench panel. All members stated that the flavor containing the thiazoline derivative has a more characteristic walnut kernel characteristic with its walnut skin astringent notes. Therefore the flavor containing the said thiazoline derivative is preferred.

A comparison with and without the same thiazoline derivative was conducted using a commercial vanilla ice cream to which the two walnut flavors have been added at the rate of 15 ppm. The ice cream with the walnut flavor containing the thiazoline derivative is preferred as being more walnut kernel-like.

EXAMPLE VIII

A flavor composition according to this invention is prepared by combining the following materials as shown:

| Compound | Amount (grams) |
| --- | --- |
| 2-Methyl pyrazine | 6 |
| 2,6-Dimethyl pyrazine | 15 |
| 2,3,5,6-Tetramethyl pyrazine | 12 |
| 3-Phenyl-4-pentenal | 1 |
| 50/50 (w/w) mixture of 2-(2'methyl-n-propyl)-4,5-dimethyl-Δ³-thiazoline and 2-n-propyl-2,4,5-trimethyl-Δ³-thiazoline | 4 |

This composition is added to a chocolate milk having a bland, thin cocoa flavor. Adding 30 mg/kg increases the sweet milk chocolate and nut-like notes and supplemental addition of 40 mg/kg of the basic cocoa flavor material as described in Example VI gives the chocolate milk an excellent cocoa flavor and aroma note.

EXAMPLE IX

To a portion of essentially flavorless salad dressing, 2-(2'-n-butyl)-4,5-dimethyl thiazoline is added at a rate of 0.10 ppm. The resulting mixture has a characteristic cucumber, spiced pickle note. The salad dressing is a mixture of the following:

| Ingredient | Parts |
| --- | --- |
| Black pepper oil | 3 |
| Nutmeg oil | 3 |
| Celery oil | 3 |
| Lemon oil | 3 |
| Mustard oil | 1 |
| Vinegar-citric acid (50:50 mixture) | 120 |
| Starch paste prepared from tapioca flour-water (50:50 mixture) | 300 |
| Liquid egg yolks | 210 |
| Sodium chloride | 7 |
| Sucrose | 10 |
| Mustard | 20 |
| Locust Bean gum | 6 |

EXAMPLE X

Test solutions of the following materials are compared from an organoleptic standpoint:

(i) 2-(1'-n-propyl)-Δ³-thiazoline having the structure:

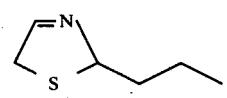

prepared according to Example VIII set forth at column 4, lines 40–50 of U.S. Pat. No. 3,816,445;

(ii) 2,4,5-trimethyl-$\Delta^3$-thiazoline having the structure:

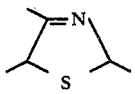

prepared by reacting 2-mercapto-3-butanone with acetaldehyde amine according to the following procedure:

120 Ml of 30% aqueous ammonia and 120 ml distilled water are placed in a 300 cc, three-necked flask, equipped with an immersion thermometer, a mechanical stirrer, a cold addition funnel and a water-cooled condenser. The temperature of the aqueous ammonia is lowered to 10°–20° C. with a wet ice bath, and 60 grams of freshly distilled acetaldehyde is added dropwise with stirring over a one-hour period. The temperature is maintained at 10°–20° C. 41.5 Grams of 3-mercapto-2-butanone is added dropwise over an one-hour period with stirring. After addition, the reaction mass is stirred for a period of three hours at room temperature. The reaction mass is then steam distilled and approximately 250 cc product are collected. The steam distillate is then intimately admixed with saturated salt solution and then extracted with three 50 ml portions diethyl ether. The diethyl ether extract is then dried over anhydrous sodium sulfate and concentrated on a rotary evaporator. Preparative GLC (second peak) yields the product, 2,4,5-trimethyl-$\Delta^3$-thiazoline.

(iii) 2-(2'-methylpropyl)-4,5-dimethyl-$\Delta^3$-thiazoline having the structure:

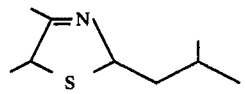

prepared according to the process of Example II.

(iv) 2-(2'-n-butyl)-4,5-dimethyl-$\Delta^3$-thiazoline having the structure:

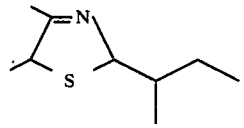

prepared according to the process of Example III.

(v) 2-n-propyl-2,4,5-trimethyl-$\Delta^3$-thiazoline having the structure:

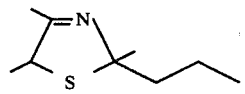

prepared according to the process of Example IV.

In various concentrations each of the test compounds is added to water or ethanol or a mixture thereof thereby formulating test solutions and the taste of the solutions (of equal intensity) is as follows:

| Number | Name | Structure | Taste and Aroma |
|---|---|---|---|
| (i) | 2-(1'-n-propyl)-$\Delta^3$-thiazoline | | A green, vegetable, nutty and roasted aroma with a sweet, green vegetable, roasted, cocoa powder-like taste at a level of 0.2 ppm. |
| (ii) | 2,4,5-trimethyl-$\Delta^3$-thiazoline | | Insofar as its flavor and aroma are concerned it has liver-like and fresh chopped meat-like notes with a light sour effect at 0.2, 0.5 and 1.0 ppm. The taste is chemical at 2.0 ppm. |
| (iii) | 2-(2'-methylpropyl)-4,5-dimethyl-$\Delta^3$-thiazoline | | A sweet, roasted meat-like, roasted nut-like, dark chocolate-like, baked goods-like and vegetable green-like aroma with a sweet, roasted meat-like, roasted nut-like, chocolate-like, vegetable green-like, hydrolyzed vegetable protein-like taste having a hydrolyzed vegetable protein aftertaste and astringent and chocolate-like notes at 2 ppm. |

-continued

| | | | |
|---|---|---|---|
| (iv) | 2-(2'-n-butyl)4,5-dimethyl-Δ³-thiazoline | | A sweet, herbaceous, spicey, chocolate-like, nutty, vegetable-like, hydrolyzed vegetable protein-like, roasted aroma with an herbaceous, vegetable green-like, nutty, roasted, chocolate-like flavor and an astringent character at 2 ppm. |
| (v) | 2-n-propyl-2,4,5-trimethyl-Δ³-thiazoline | | A sweet, green bean-like, cucumber-like, geranium-like and spicey aroma with cucumber-like, green bean-like, spicey, watermelon-like, black pepper-like flavor characteristics and an astringent character at 1 ppm. |

The compounds having the names and structures:

| | | |
|---|---|---|
| (iii) | 2-(2'-methylpropyl)-4,5-dimethyl-Δ³-thiazoline | |
| (iv) | 2-(2'-n-butyl)4,5-dimethyl-Δ³-thiazoline | |
| (v) | 2-n-propyl-2,4,5-trimethyl-Δ³-thiazoline | | are unexpectedly, unobviously and advantageously useful for imparting, enhancing or modifying uncooked fresh green vegetable tastes, cocoa tastes and walnut tastes as well as uncooked green vegetable aromas, cocoa aromas and walnut aromas in foodstuffs where such tastes and aromas are useful, given the flavor properties of the compounds having the names and structures:

| | | |
|---|---|---|
| (i) | 2-(1'-n-propyl-Δ³-thiazoline | |
| | and | 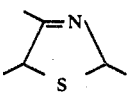 |
| (ii) | 2,4,5-trimethyl-Δ³-thiazoline | | which are not considered to be so useful for fresh green vegetable, cocoa or walnut tastes and aromas.

BRIEF DESCRIPTION OF THE DRAWINGS

FIG. 2 represents the MS profile for an isomeric form of 2-(2'-methyl-n-propyl)-4,5-dimethyl-Δ³-thiazoline produced according to Example I.

FIG. 3 represents the GC-MS profile for 2-(2'-methyl-n-propyl)-4,5-dimethyl-Δ³-thiazoline (isomer II) produced according to Example I.

FIG. 4 represents the MS profile for 2-(2-n-butyl) 4,5-dimethyl-Δ³-thiazoline extracted from hydrolyzed vegetable protein and produced according to Example I.

FIG. 5 represents the MS profile for a second isomer of 2-(2'-n-butyl)-4,5-dimethyl-Δ³-thiazoline extracted from hydrolyzed vegetable protein and produced according to Example I.

FIG. 10 represents the MS profile for a first isomer of 2-(2'-n-butyl)-4,5-dimethyl-Δ³-thiazoline produced according to Example III.

FIG. 11 represents the MS profile for a second isomer of 2-(2'-n-butyl)-4,5-dimethyl-Δ³-thiazoline produced according to Example III.

Figure 1:
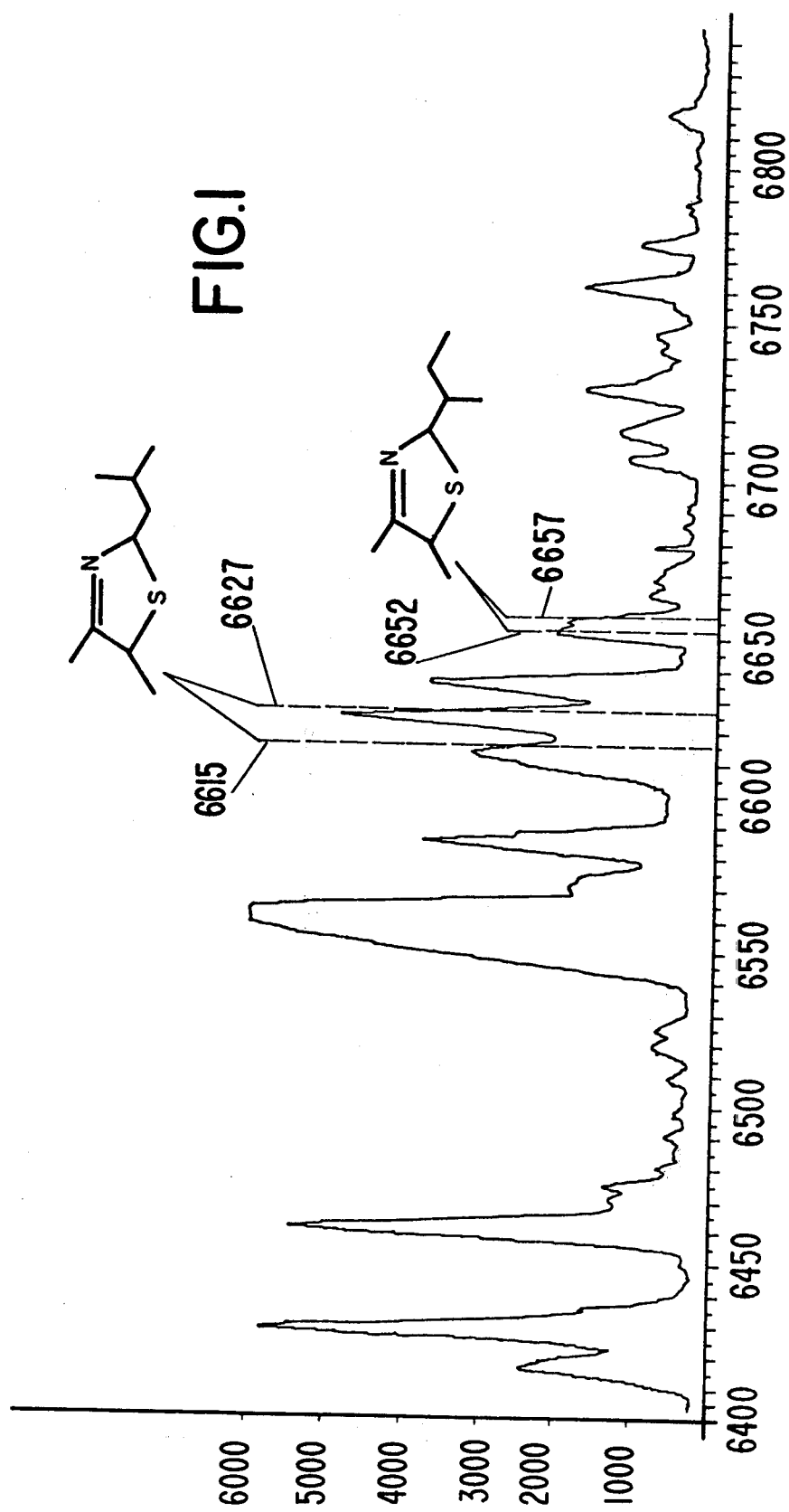
FIG. 1 represents that portion of the GLC spectrum setting forth the peaks for 2-substituted-4,5-dimethyl-Δ³-thiazolines obtained from the distillate of hydrolyzed vegetable protein.
Figure 6:
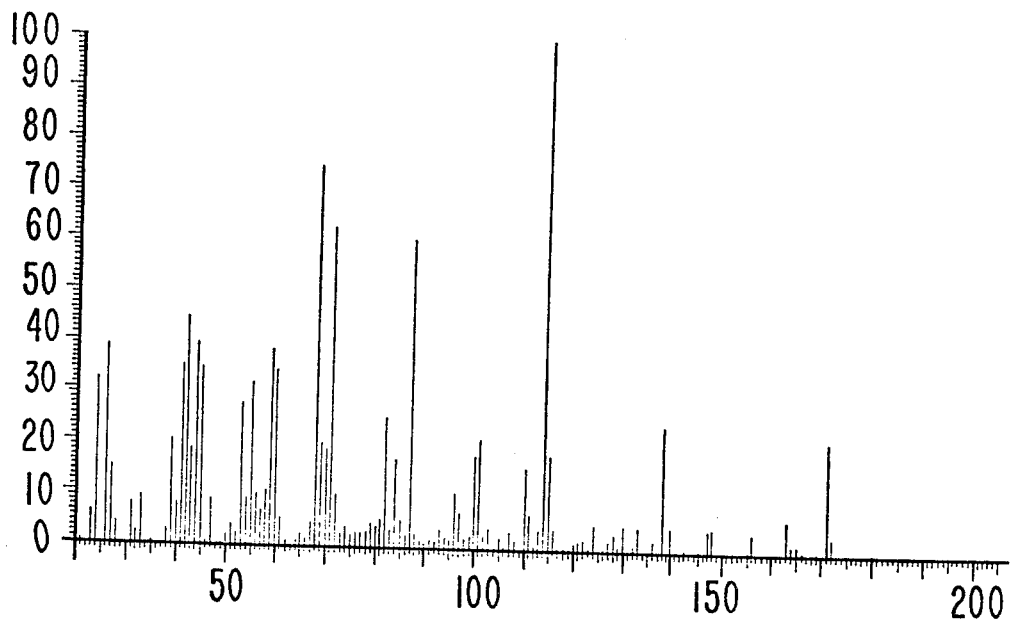
FIG. 6 represents the MS profile for a first isomer of 2-(2'-methyl-n-propyl)-4,5-dimethyl-Δ³-thiazoline produced according to Example II.
Figure 7:
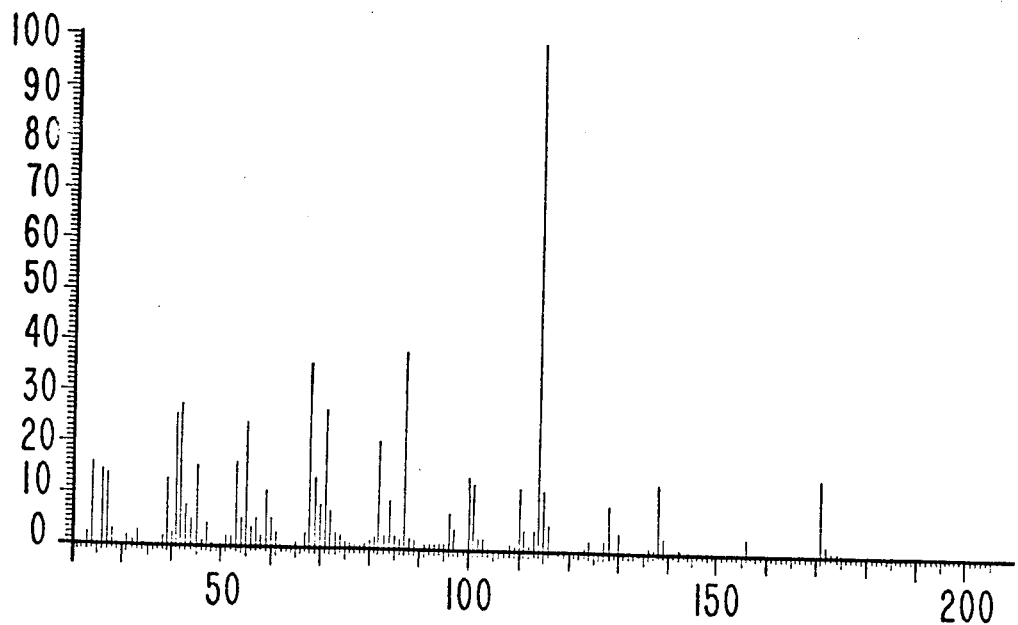
FIG. 7 represents the MS profile of a second isomer of 2-(2'-methyl-n-propyl)-4,5-dimethyl-Δ³-thiazoline produced according to Example II.
Figure 8:
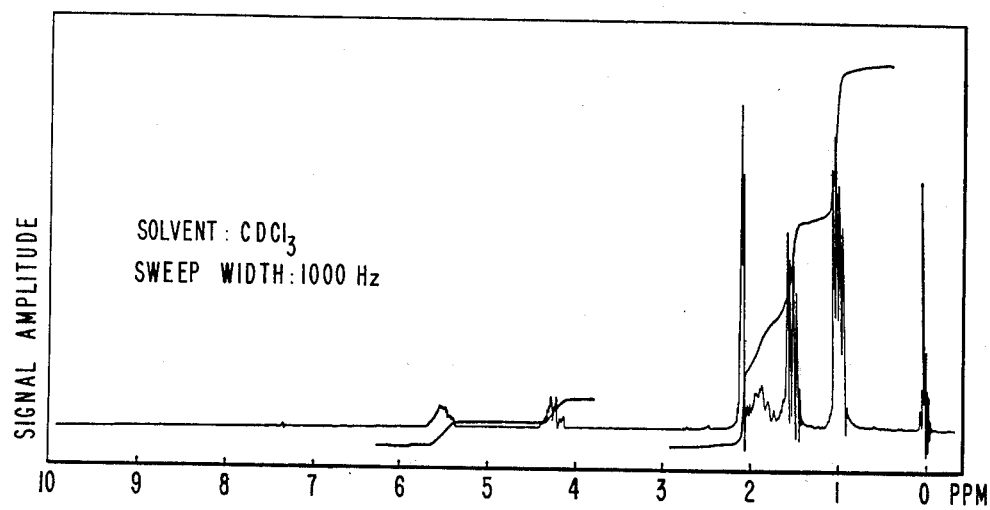
FIG. 8 represents the NMR spectrum for 2-(2'-methyl-n-propyl)-4,5-dimethyl-Δ³-thiazoline produced according to Example II.
Figure 9:
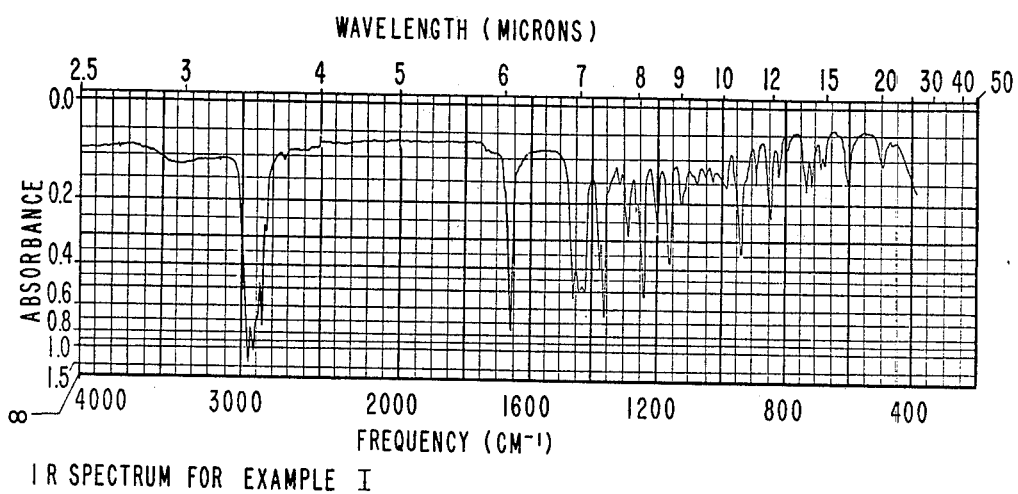
FIG. 9 represents the infrared spectrum for 2-(2'-methyl-n-propyl)-4,5-dimethyl-Δ³-thiazoline produced according to Example II.
Figure 12:
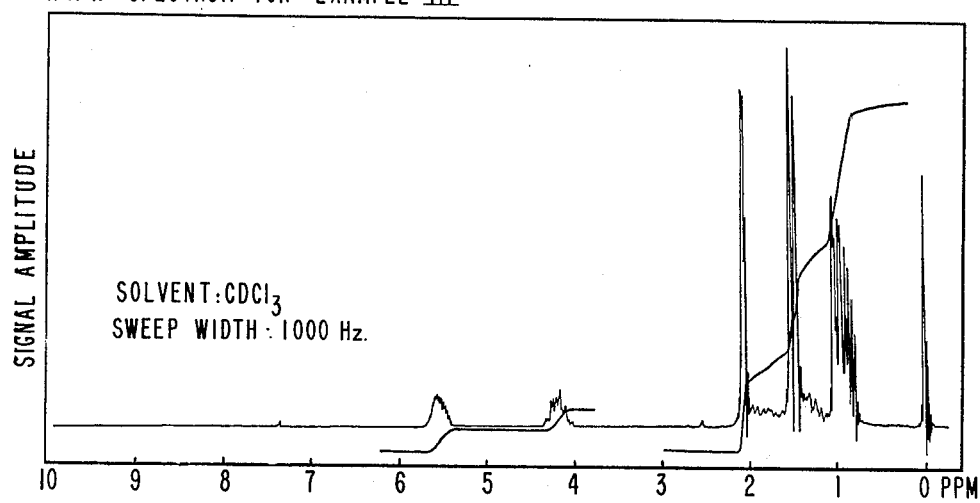
FIG. 12 represents the NMR spectrum for 2-(2'-n-butyl) 4,5-dimethyl-Δ³-thiazoline produced according to Example III.
Figure 13:
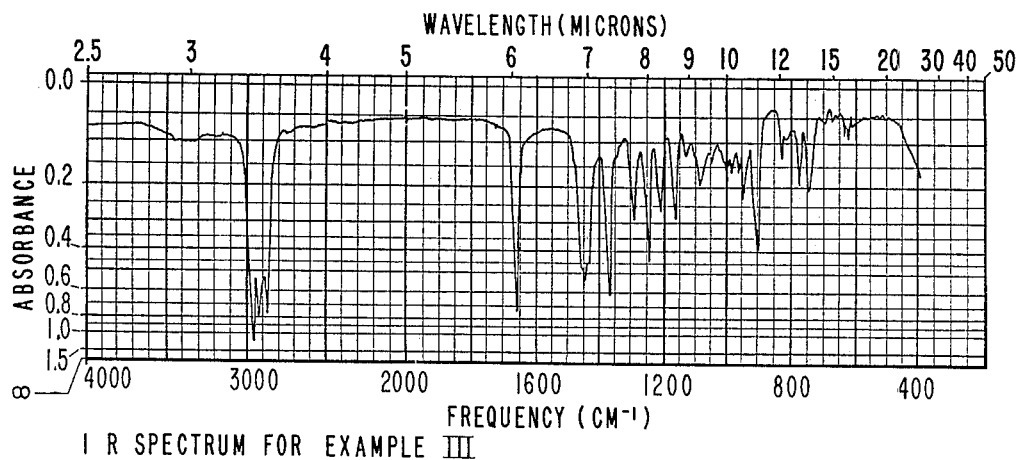
FIG. 13 represents the infrared spectrum for 2-(2'-n-butyl)-4,5-dimethyl-Δ³-thiazoline produced according to Example III.
Figure 14:
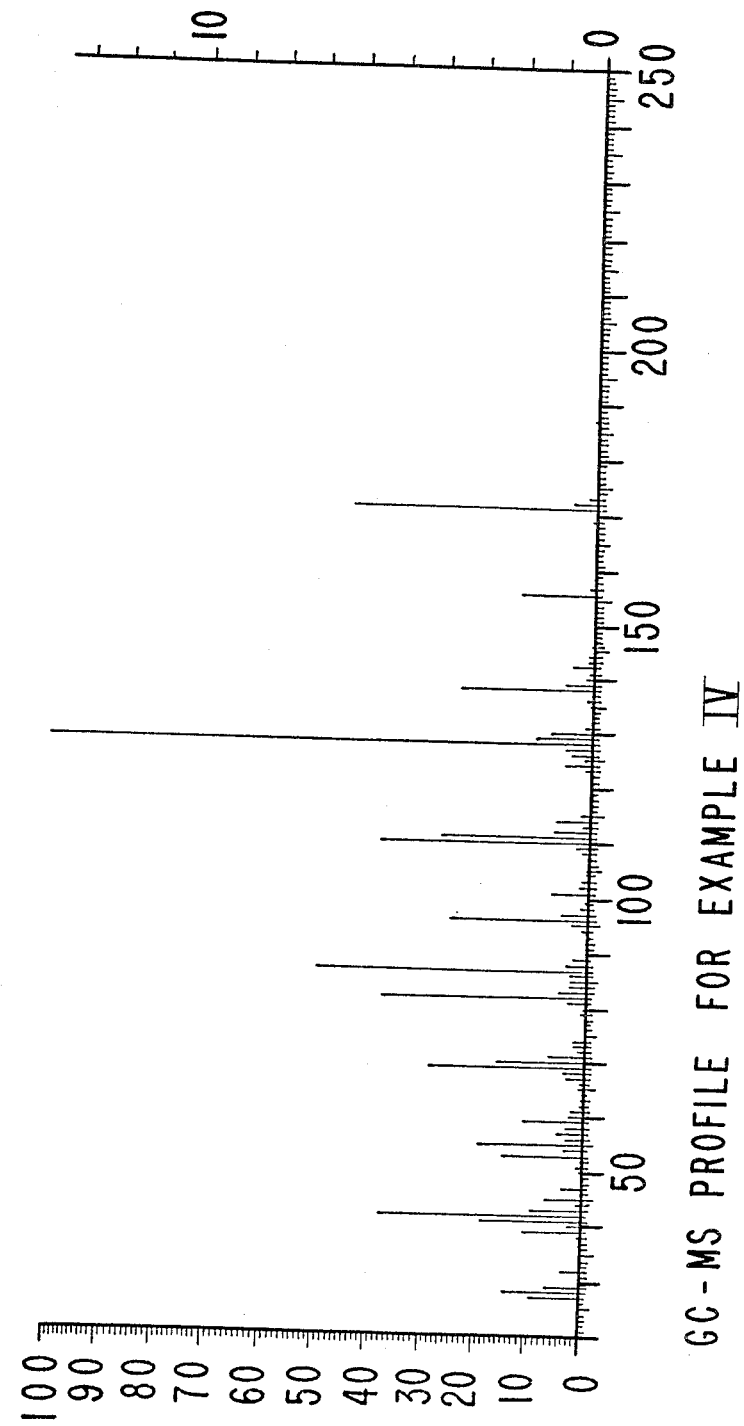
FIG. 14 represents the MS profile for 2-n-propyl-2,4,5-trimethyl-Δ³-thiazoline produced according to Example IV.
Figure 15:
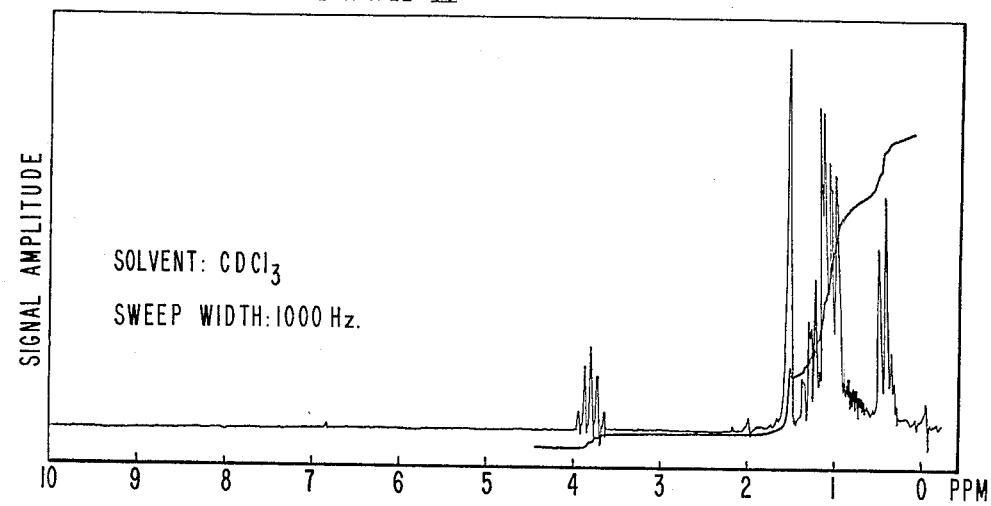
FIG. 15 represents the NMR spectrum for 2-n-propyl-2,4,5-trimethyl-Δ³-thiazoline produced according to Example IV.
Figure 16:
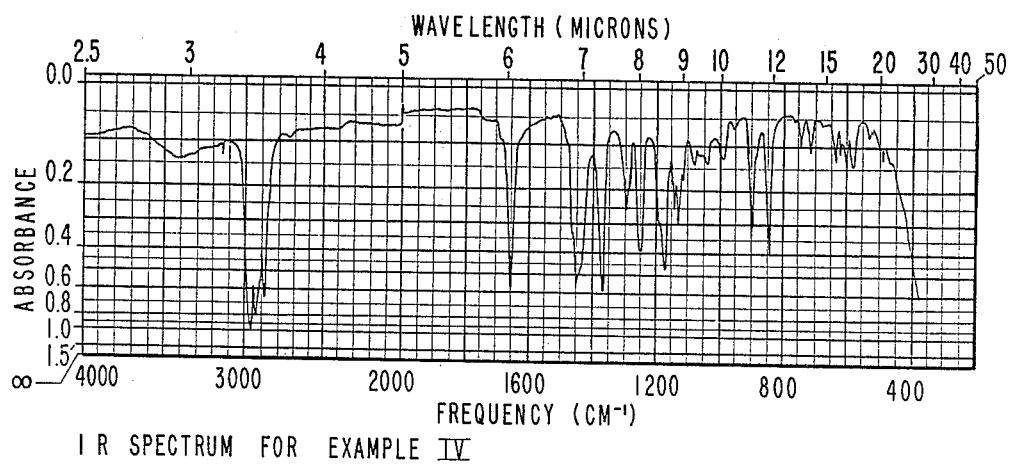
FIG. 16 represents the infrared spectrum for 2-n-propyl-2,4,5-trimethyl-Δ³-thiazoline produced according to Example IV.

What is claimed is:

1. A flavor composition for increasing the sweet milk chocolate and nut-like notes of chocolate foodstuffs comprising a 50:50 mixture of 2-(2'-methyl-n-propyl)-4,5-dimethyl-Δ³-thiazoline:2-n-propyl-2,4-trimethyl-Δ³-thiazoline and the remainder of said composition being a mixture of:
2-Methyl pyrazine;
2,6-Dimethyl pyrazine;
2,3,5,6-Tetramethyl pyrazine; and
3-Phenyl-4-pentenal.

* * * * *